United States Patent [19]

Bergin

[11] Patent Number: 5,709,429
[45] Date of Patent: Jan. 20, 1998

[54] CUPHOLDER ATTACHMENT FOR A SEAT BRACKET

[75] Inventor: Peter W. A. Bergin, Hopkins, Minn.

[73] Assignee: MTS Northwest Sound, Inc., Minneapolis, Minn.

[21] Appl. No.: 631,544

[22] Filed: Apr. 12, 1996

Related U.S. Application Data

[63] Continuation of Ser. No. 311,513, Sep. 23, 1994.

[51] Int. Cl.$^6$ ............................................. A47C 7/62
[52] U.S. Cl. .................... 297/188.04; 297/248; 411/178; 403/338
[58] Field of Search .................... 297/188.04, 188.06; 411/178; 248/916; 403/337, 338; D7/620

[56] References Cited

U.S. PATENT DOCUMENTS

| | | | |
|---|---|---|---|
| D. 162,959 | 4/1951 | Janes et al. | D58/26 |
| D. 244,302 | 5/1977 | Bradley | D27/14 |
| D. 307,852 | 5/1990 | Clark | D7/620 |
| D. 328,223 | 7/1992 | Clark | D7/622 |
| D. 342,871 | 1/1994 | Stern et al. | D7/620 |
| D. 346,996 | 5/1994 | Blackburn | D7/620 X |
| D. 367,997 | 3/1996 | Ayotte et al. | D7/620 |
| 1,149,541 | 8/1915 | Rees et al. | |
| 1,484,001 | 2/1924 | Ainsworth | 248/916 X |
| 1,680,469 | 3/1928 | Morgan | |
| 2,132,331 | 10/1938 | Wanamaker | 155/1 |
| 2,319,109 | 5/1943 | Bulloch | 272/57 |
| 2,471,030 | 5/1949 | Foulke | 211/75 |
| 2,706,516 | 4/1955 | Nordmark | 155/188 |
| 2,807,315 | 9/1957 | Manne | 155/188 |
| 2,877,976 | 4/1959 | Massari | 248/313 |
| 3,041,107 | 6/1962 | Schaefer | 297/248 |
| 3,172,713 | 3/1965 | Rupert | 312/235 |
| 3,224,644 | 12/1965 | Davis | 222/162 |
| 3,508,732 | 4/1970 | Trachtenberg | 155/188 |
| 3,565,384 | 2/1971 | Lockwood | 248/312 |
| 4,446,185 | 5/1984 | Waragai et al. | 411/178 X |
| 4,865,237 | 9/1989 | Allen | 224/42.45 |
| 5,029,936 | 7/1991 | Gonzalez | 403/338 X |
| 5,040,709 | 8/1991 | Neugent | 224/35 |
| 5,213,298 | 5/1993 | Johnson | 248/313 |
| 5,232,137 | 8/1993 | Devine | 224/252 |
| 5,249,770 | 10/1993 | Louthan | 248/311.2 |
| 5,320,319 | 6/1994 | Winger et al. | 248/312.1 |
| 5,421,638 | 6/1995 | Ayotte et al. | 297/188.04 |

FOREIGN PATENT DOCUMENTS

| | | | |
|---|---|---|---|
| 2514086 | 4/1983 | France | 411/178 |
| 27 29 565 | 1/1978 | Germany . | |
| 593440 | 10/1947 | United Kingdom | 411/178 |

Primary Examiner—Peter M. Cuomo
Assistant Examiner—David E. Allred
Attorney, Agent, or Firm—Westman, Champlin & Kelly, P.A.

[57] ABSTRACT

A drink container holder is mounted to a generally upright seat standard having at least one seat bracket to support a seat back in a generally upright position. The seat back is mounted to the seat bracket with a bolt and nut. The container holder includes an open top receptacle and a pair of bosses that have threaded metal inserts that receive the seat fasteners so the fasteners can be tightened into the inserts. When tightened, the seat bolts and container holder are securely held in place. A support flange attached to the container holder braces the container holder against the seat backs for stability.

10 Claims, 5 Drawing Sheets

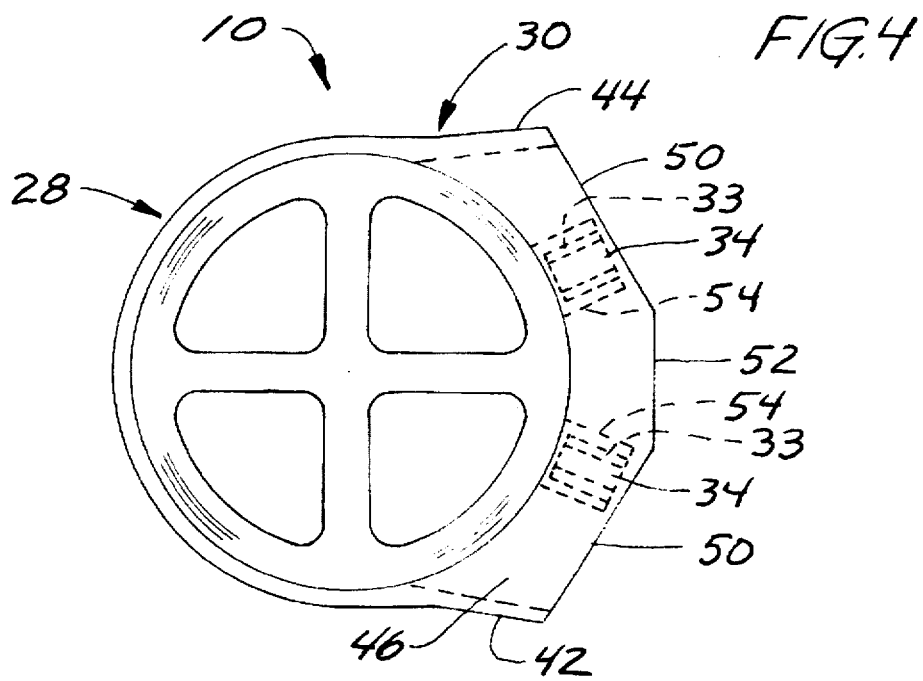
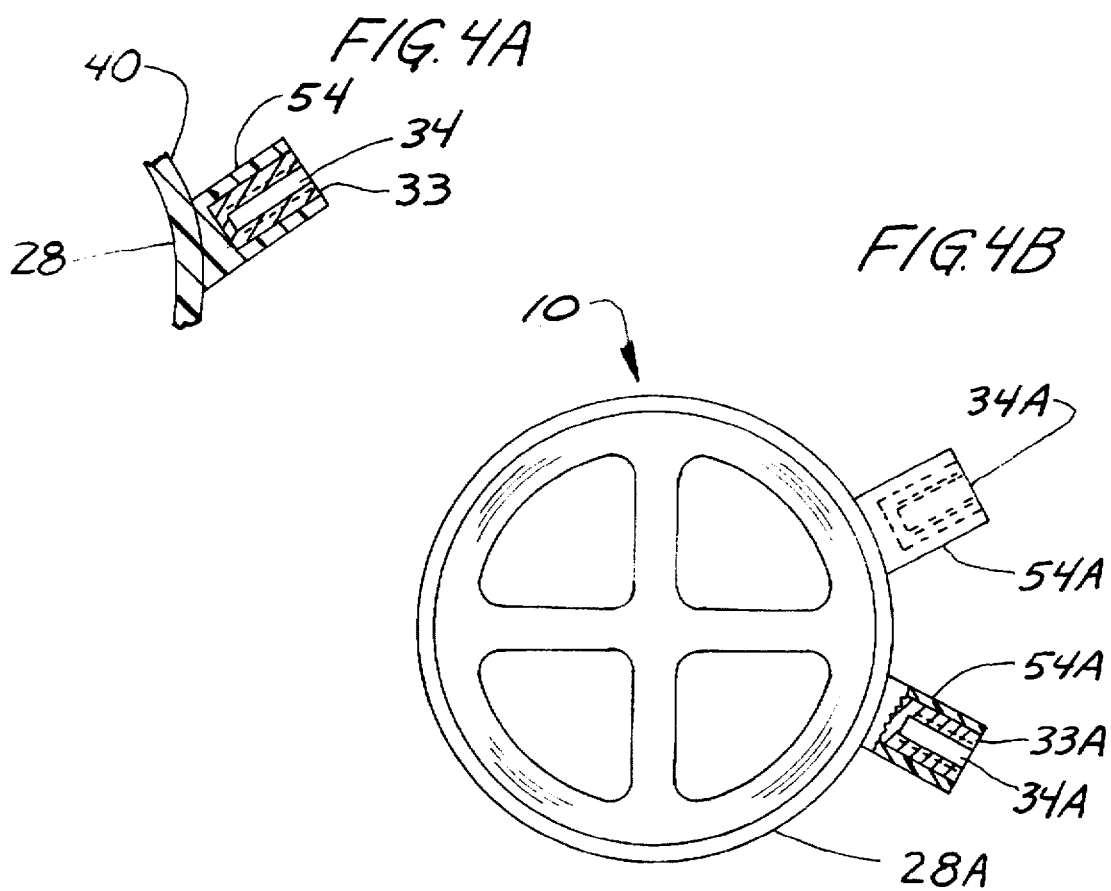

CUPHOLDER ATTACHMENT FOR A SEAT BRACKET

This is a continuation of application Ser. No. 08/311,513, filed Sep. 23, 1994.

BACKGROUND OF THE INVENTION

The present invention is directed to a device suitable for use as a drink container holder which can be mounted on a seat standard. Specifically, the present invention relates to a drink container holder which can be quickly mounted on a seat standard using existing seat bolts threaded into inserts molded on the drink container holder.

In stadiums, arenas and theaters, the common problem is the lack of a place to rest cups, popcorn containers, or the like. Often, such containers are placed on the floor or on the arm rest of the seat, only to be accidentally knocked over or otherwise spilled. In the alternative, the occupant of the seat must hold the containers, thereby restricting the use of the occupant's hands.

A number of types of container holders have been used to alleviate this problem. Among those are various types of container holders are adapted to be mounted to the back of a seat using brackets that extend above and below the container holder.

There is a need for a container holder which can be quickly mounted to a seat back using existing fasteners and held without having extra brackets.

SUMMARY OF THE INVENTION

The present invention relates to a drink container holder for theater, stadium and other public arena seats. The holder bolts to the backs of seats against seat back brackets of a generally upright seat standard, preferably using the existing seat fasteners.

The drink container holder includes a container receptacle with an open top and a bottom support for a container. Metal inserts having threaded apertures are molded to the exterior of the container holder receptacle wall and the seat back fasteners are threaded into the inserts. The metal inserts support the container holder and permit tightening the fasteners to securely hold the seat backs to their brackets as well.

A support flange is also attached to the exterior of the receptacle wall and at least partially encompasses the metal inserts, for appearance purposes and for bracing the receptacle against the seat back.

BRIEF DESCRIPTION OF THE DRAWINGS

FIG. 4 is a top view of the container holder of FIG. 1.

FIG. 4A is a fragmentary sectional view of a portion of a mounting member used with the container holder of FIG. 4.

FIG. 4B is a top view of a modified container holder embodying features of the present invention.

DETAILED DESCRIPTION OF THE PREFERRED EMBODIMENTS

Figure 1:
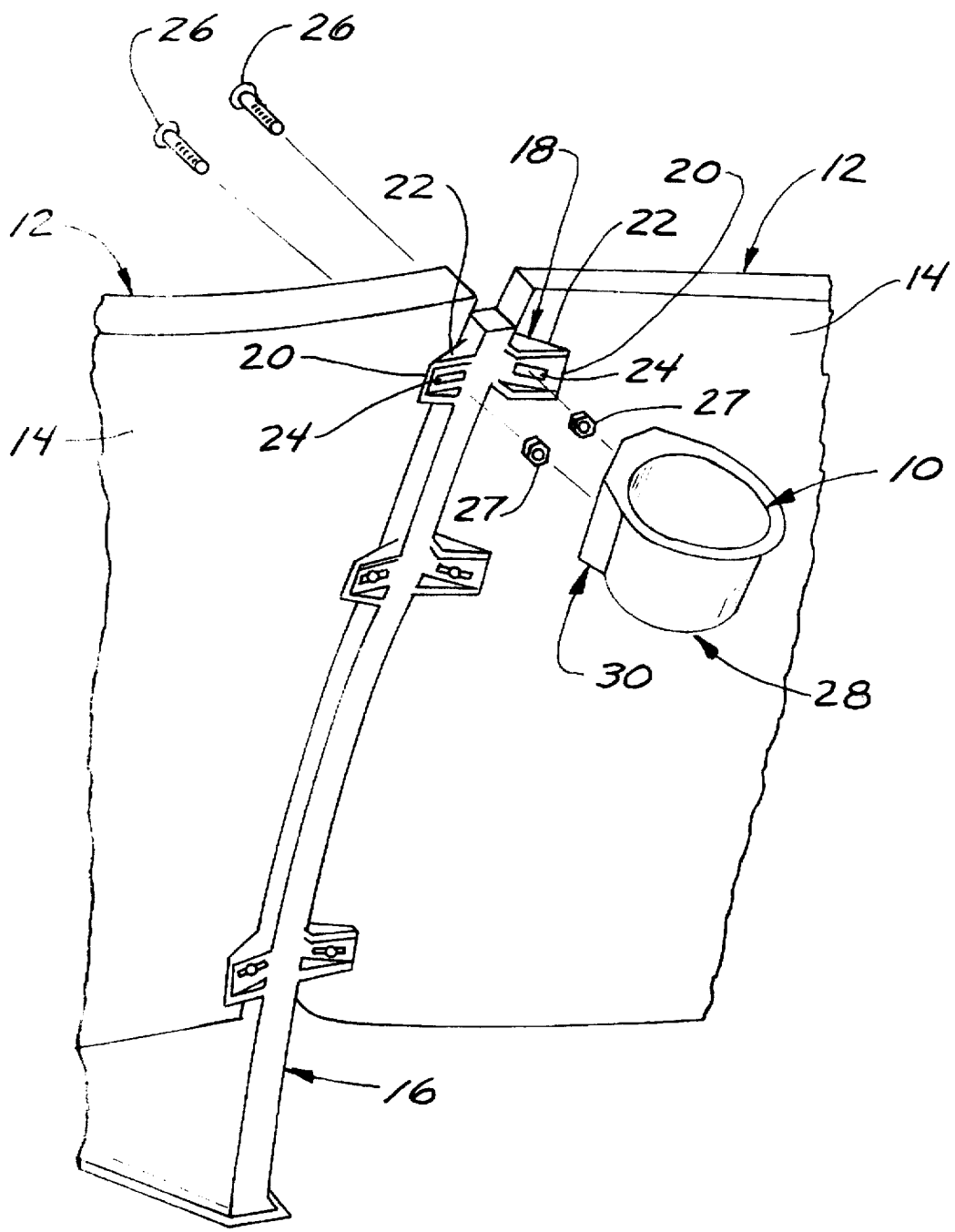
FIG. 1 is an exploded perspective rear view of a portion of a seat and a container holder embodying features of the present invention.

A container holder 10 of the present invention is shown in FIG. 1 attached to, and extending between, two seat backs 12, each attached to a seat standard 16, the seats each have a backside 14. At least one, but typically a plurality of seat brackets 18 extend from the standard 16 and are used to support the seat backs 12. The seat backs 12 are typically fabricated from polymeric materials, metal, or wood. The standard 16 and seat brackets 18 are typically fabricated from a metal such as steel, aluminum or cast iron.

The seat bracket 18 includes two ears 20 laterally extending from the standard 16. The ears 20 are reinforced by gussets 22. Each ear 20 has a slot 24 through which a seat bolt 26 extends for securing the seat backs 12 to the seat brackets. Nuts 27 shown in FIG. 1 are used for the bolts 26 to hold the seat backs secured, but are removed when the container holder 10 is installed. The standard 16 is generally upright and thus supports the seat backs 12 in a generally upright position laterally of the standard 16.

Figure 2:
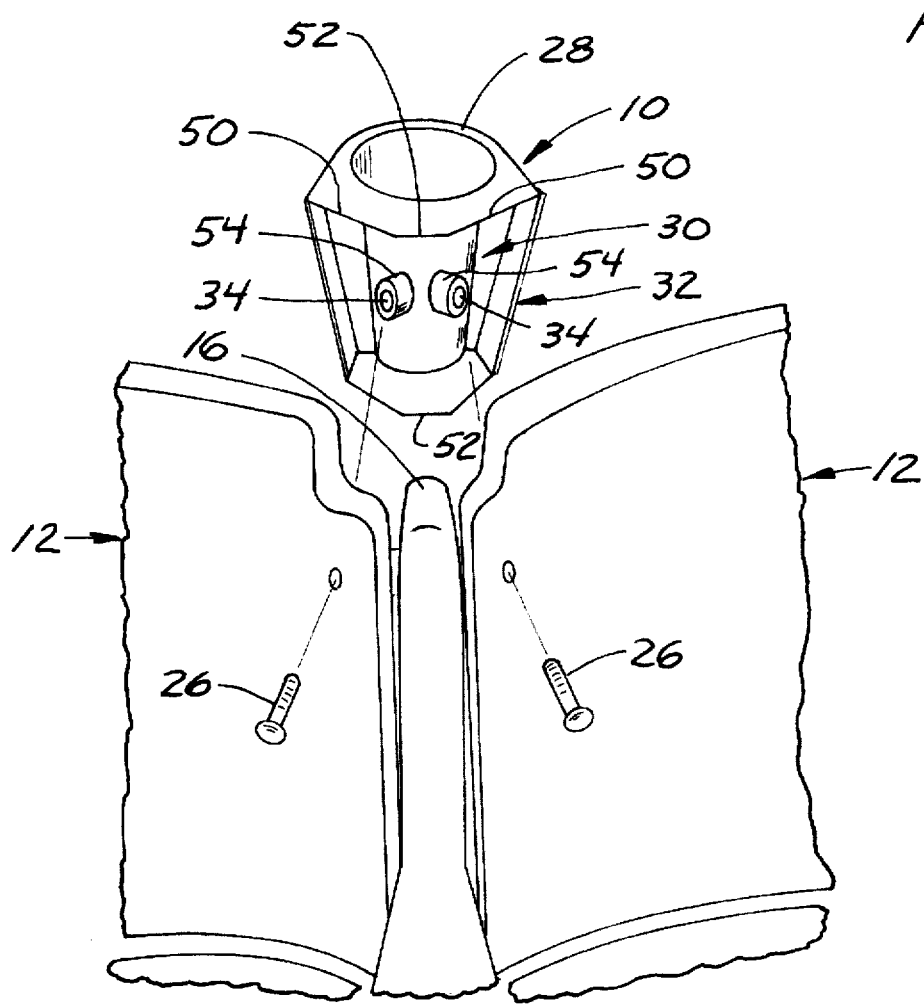
FIG. 2 is an exploded perspective front view of a portion of a seat and the container holder of FIG. 1.

The container holder 10, which is also shown in more detail in FIG. 2, is preferably fabricated from a polymeric material such as polypropylene and comprises a generally cylindrical wall 40 forming a receptacle 28 suitable for use as a cupholder. A mounting assembly 30 includes a support flange 32 which partially encompasses a pair of outwardly extending brass inserts 33 molded in place in bosses 54. Each insert has a threaded aperture 34.

Figure 3:
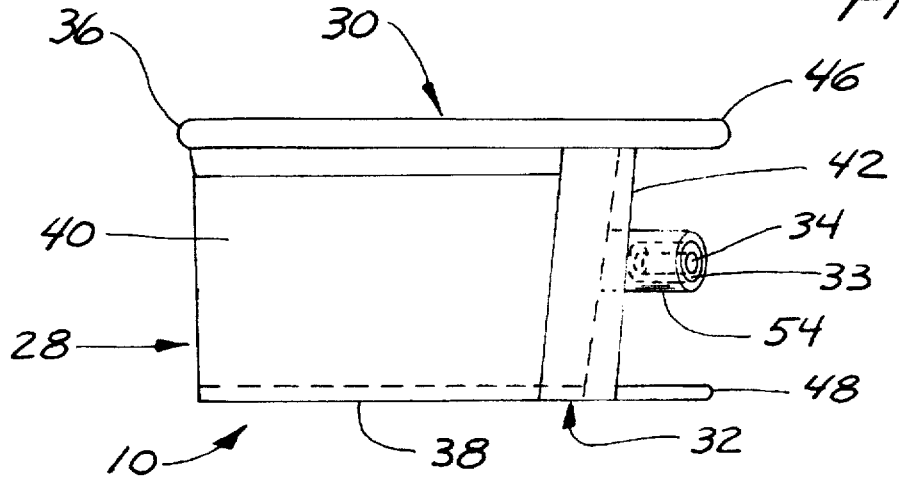
FIG. 3 is side view of the container holder of FIG. 1.

As also seen in FIGS. 3 and 4, a rim 36 surrounds the open top of the receptacle. A lower end support 38 for a cup is provided in the receptacle.

The support flange 32 of the mounting assembly comprises two seat contacting flanges 42, 44 integral with the wall 40, and upper and lower standard contacting flanges 46, 48, respectively. The upper and lower flanges 46, 48 are beveled to include side seat portions 50 and a center standard contacting portion 52.

The inserts 33 are preferably made of brass and are mounted (molded) in the two bosses 54 so that they function as nuts for the fasteners 26. The bosses 54 are mounted to (preferably molded as part of) the wall 40 and positioned within the perimeter of support flange 32. Preferably, the receptacle 28, support flange 32, and bosses 54 are molded from the same piece of material. The metal inserts 33 permit the seat bolts to be threaded tightly and securely to secure the seat backs and container holder 10 in place.

Figure 5:
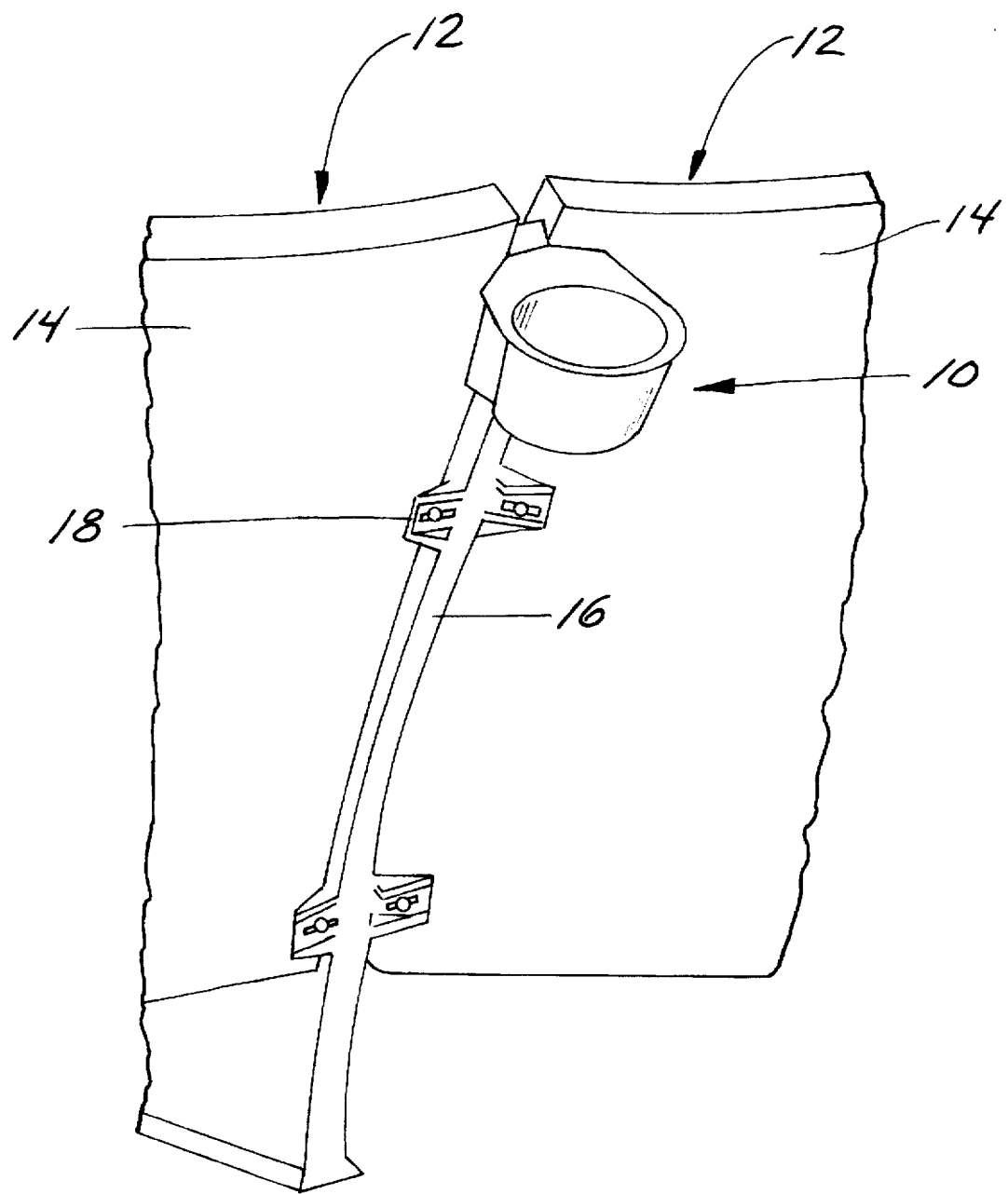
FIG. 5 is a rear perspective view of seats with the container holder of FIG. 1 mounted in place.

The seat bolts 26 are extended through the seats 12 and slots 24, and mated with the threaded apertures 34 of the inserts 33 as seen in FIGS. 1, 2 and 5. As the bolts 26 are tightened, the container holder 10 is pulled toward the seat bracket 18. The seat bracket 18 is positioned within the perimeter of support flange 32. When the seat bolts 26 are tightened into the inserts 33, the seat backs 12 are clamped to the seat bracket 18 and the container holder 10 is also firmly clamped to the seat bracket 18. The side flanges 42, 44 engage the seat backs before the bolts are firmly tightened and serve to firmly brace the container holder 10 against the seat back sides 14. The portions 50 and 52 of the upper and lower flanges serve to also firmly brace the container holder 10 against the back sides 14 of the seat backs 12 and standard 16, respectively. Thus, the support flange 32 firmly braces the receptacle against the seat back 12 and standard 16.

By attaching the container holder 10 with inserts that align with the fastener for the seat brackets 18, no new holes need to be drilled in the seat backs 12. The seat bolts 26 used to attach the container holder 10 can be the same bolts that are used to attach the seat backs 12 to the standard 16. For installing the container holder to existing seat backs, the seat bolts 26 are first removed from the seat brackets 18 and the seats 12, and the container holder 10 is then put in place. The seat bolts 26 are then inserted as previously described. Typically, each standard 16 has a plurality of seat brackets 18. The container holder 10 may be attached to any one of the seat brackets 18 and thus provides various installation options. FIG. 5 shows the container holder 10 as installed.

Figure 5A:
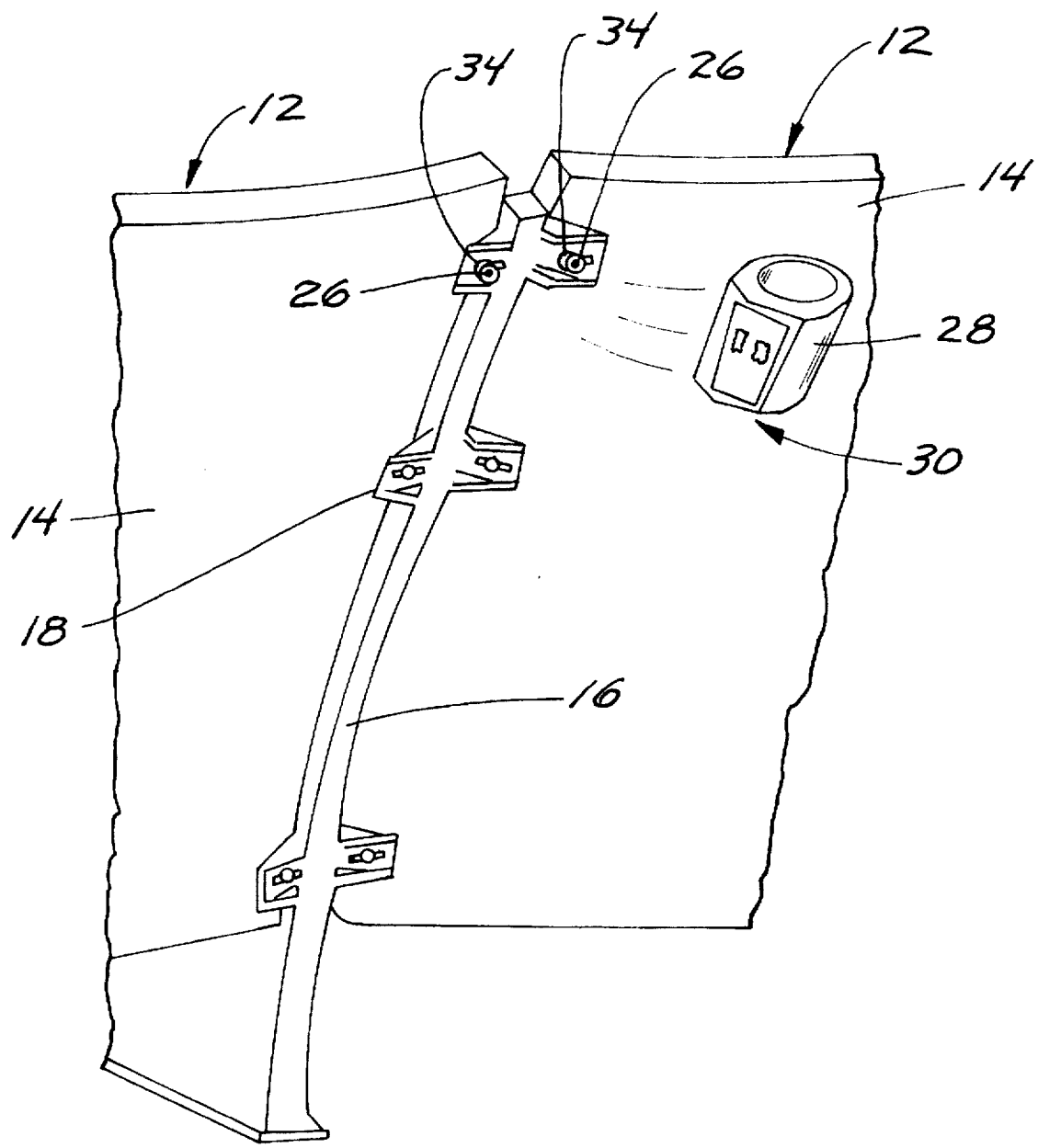
FIG. 5A is a rear perspective view of seats prior to installation of the container holder of FIG. 1.

In case the container holder 10 is hit so it breaks away from its supports, the inserts will separate from the bosses 54 and either pull out from the ends or split the relatively thin walls of the bosses. Under force the inserts will delaminate from the bosses. Also, the bosses can be made so they break away from wall 40 with a reduced strength connection or the like. The threaded inserts 33 however, remain mated tightly with the seat bolts 26 and continue to function as nuts for securing the seat backs 12 to the seat brackets 18 as seen in FIG. 5A. Thus, such breakage of a container holder will not cause the seat back to loosen.

In an alternative embodiment, as shown in FIG. 4B, container holder 10A includes a unitary molded receptacle 28A and bosses 54A having the threaded apertures 34A mounted therein. The molded receptacle 28A and bosses 54A are preferably fabricated from polypropylene with brass inserts 33A having threaded apertures 34A.

The previously described embodiments of the present invention have many advantages and provide many unexpected benefits. The compact design of the container holder 10 requires less materials. This conserves resources. Furthermore, the compact design allows the container holder 10 to be mounted to any selected one of the seat brackets 1B on a standard 16. This allows adjustable positioning of the container holder 10 on the standard 16.

Another advantage of the container holder 10 is that it makes use of the existing structures. The container holder 10 attaches to the existing hardware wherein no new pieces are required and no new holes need be drilled.

A major factor is that if vandals or accidents cause the container holder 10 to be broken away the seat backs will not loosen because the inserts 33 will remain in place. The seat bracket 18 and the inserts 33 are hidden by the support flange 32. Thus, seat occupants are less likely to be tempted to tamper with the container seat supporting structures.

Although the present invention has been described with reference to preferred embodiments, workers skilled in the art will recognize that changes may be made in form and detail without departing from the spirit and scope of the invention.

What is claimed is:

1. A drink container holder, for use with a generally upright seat standard for supporting first and second seat backs in a generally upright position laterally of the standard with fasteners comprising:

an open top receptacle having a side wall and a lower end opposite the open top suitable for supporting a drink container within the receptacle, the open top being generally planar; and a mounting member attached to the side wall of the receptacle and extending along the sidewall no more than coterminous with the open top and lower end, the mounting member having first and second portions with first and second apertures respectively for receiving and securing first and second fasteners from said first and second seat backs respectively on which the container holder is to be mounted, said first and second apertures being laterally spaced-apart along the sidewall in a direction generally parallel to the plane of the open top, and a narrow edge support flange having a free distal narrow edge portion, said support flange being attached to the side wall of the receptacle and spaced-apart from the portions with the first and second apertures and with said free distal narrow edge portion of the narrow edge support flange spaced outwardly from the receptacle side wall for bracing the receptacle against said first and second seat backs supported on the seat standard on which the container.

2. The container holder of claim 1 wherein the mounting member first portion comprises a first boss attached to the side wall of the receptacle and extending outwardly therefrom, the first aperture being formed therein; and wherein the mounting member second portion comprises a second boss attached to the side wall of the receptacle and extending outwardly therefrom, the second aperture being formed in the second boss.

3. The container holder of claim 2 wherein the first and second bosses have separate metal inserts held therein, the apertures being formed in the inserts and being threaded, and the fasteners are threaded bolts that thread into the apertures.

4. The container holder of claim 3 wherein the inserts act as nuts to secure the seat backs to the seat standard.

5. The container holder of claim 2, wherein the narrow edge support flange includes an upper flange portion adjacent the open top of the container extending laterally of an upright direction, a pair of spaced apart upright support flange portions joining the upper portion adjacent the open top, the upper portion adjacent the open top having an edge configured to conform to surfaces of a seat standard and seat back on which the container holder is to be mounted, the upper and spaced apart upright flange portions shielding the first and second bosses from view when the container holder is installed on a seat standard.

6. The container holder of claim 5 and a lower flange portion adjacent the lower end of the receptacle and extending transverse to an upright direction, and joining the upright support flange portions at lower ends thereof.

7. A device suitable for use as a drink container holder for use with a generally upright seat standard having at least one seat bracket extending laterally therefrom, the seat bracket having a first ear and a second ear wherein the standard supports a first seat back secured to the first ear by a first fastener and a second seat back secured to the second ear by a second fastener, the device comprising:

an open top receptacle having a side wall and a lower end opposite the open top for supporting a drink container within the receptacle the open top being generally planar, a first boss affixed to the side wall of the receptacle and extending outwardly therefrom having a first threaded insert mounted therein; and a second boss affixed to the side wall of the receptacle and extending therefrom having a second threaded insert mounted therein;

the threaded inserts being laterally spaced-apart along the sidewall in a direction generally parallel to the plane of the open top;

a pair of spaced support flanges with free narrow distal edge portions, said support flanges being attached to the sidewall of the receptacle, said pair of spaced support flanges positioned with the first and second bosses between the support flanges, the support flanges extending in direction from the open top toward the lower end of the receptacle no more than coterminous with the open top and lower end and extending outwardly from the side wall;

an upper flange adjacent the open top and a lower flange adjacent the lower end of the receptacle, the upper and lower flanges being joined to the spaced support flanges;

the threaded inserts receiving the first and second fasteners for simultaneously securing the receptacle and the respective seat backs to a seat bracket, the upper, lower, and support flanges adapted to engage first and second seat backs supported on a seat bracket to which the device is to be secured to enclose and shield the threaded inserts when the threaded inserts are threadedly tightened; and wherein the container is of a generally unitary-piece construction.

8. The device of claim 7 wherein the bosses have ends that extend from the side wall a distance selected so the free narrow distal edge portions of the support flanges engage a standard and seat back on which the device is to be mounted shortly before the ends of the bosses tighten against a seat bracket as threaded fasteners are tightened in the threaded apertures.

9. The device of claim 7 wherein when the receptacle is mounted on a standard and loaded until failure occurs, the threaded inserts separate from the receptacle and continue to function with the fasteners to secure to seat backs to the seat bracket.

10. A device suitable for use as a drink container holder for use with a generally upright seat standard having at least one seat bracket extending laterally therefrom, the seat bracket having a first ear and a second ear wherein the standard supports a first seat back secured to the first ear by a first fastener and a second seat back secured to the second ear by a second fastener, the device comprising:

an open top receptacle having a side wall and a lower end opposite the open top suitable for supporting a drink container within the receptacle, the open top being generally planar; and a mounting member attached to the side wall of the receptacle and extending along the sidewall no more than coterminous with the open top and lower end, the mounting member having a portion with a first aperture for receiving and securing the fastener from the first seat back and a second aperture for receiving and securing the fastener from the second seat back wherein the first and second apertures are laterally spaced-apart along the sidewall in a direction generally parallel to the plane of the open top, and a narrow edge support flange having a free distal narrow edge portion, said support flange being attached to the side wall of the receptacle and spaced-apart from the first and second apertures, and with said free distal narrow edge portion of the narrow edge support flange spaced outwardly from the receptacle side wall for bracing the receptacle against said first and second seat backs supported on the seat standard on which the container holder is to be mounted;

wherein the open top receptacle and mounting member are of generally unitary-piece construction.

* * * * *